Nov. 26, 1968    R. H. POORMAN    3,412,644
ANGLE TABLE CONSTRUCTION FOR MACHINE TOOLS
Filed March 25, 1966    2 Sheets-Sheet 1

INVENTOR.
Royal H. Poorman
BY
Frease & Bishop
ATTORNEYS

Nov. 26, 1968   R. H. POORMAN   3,412,644
ANGLE TABLE CONSTRUCTION FOR MACHINE TOOLS
Filed March 25, 1966   2 Sheets-Sheet 2

INVENTOR.
Royal H. Poorman
BY
Frease & Bishop
ATTORNEYS

# United States Patent Office 3,412,644
Patented Nov. 26, 1968

3,412,644
ANGLE TABLE CONSTRUCTION FOR
MACHINE TOOLS
Royal H. Poorman, 6055 Wiclif Road NE.,
Canton, Ohio 44721
Filed Mar. 25, 1966, Ser. No. 537,430
5 Claims. (Cl. 90—58)

ABSTRACT OF THE DISCLOSURE

An angle table converter attachment for a machine tool indexing and dividing device having a spindle rotatable to indexed positions, about a first axis and rotatable from below horizontal to and beyond vertical indexed positions about a second axis at right angles to the first axis.

The angle table converter includes a table member having a flat work surface with means for mounting a workpiece thereon. Shank means extends longitudinally from one end of the table member, parallel to the flat work surface. The shank means is operatively connected to the spindle of the indexing and dividing device.

---

The invention relates to table means for mounting a workpiece on a machine tool, and more particularly to the modification of and to an attachment for a typical indexing and dividing device to convert such indexing device into a compound angle work table for use on such machine tools as horizontal and vertical milling machines, drill presses, shapers, planers, surface grinders, and the like.

Difficult setup operations are involved where a workpiece is to be machined on a machine tool of the indicated type to form machined surfaces on the work-piece angularly located out of horizontal or vertical or about an axis of the work-piece, and sometimes also indexed or divided to predetermined degree with respect to a surface already machined on the work-piece.

Heretofore, such machining operations have required the use of an all-angle sine table. Such a table is complicated in construction and very costly; and the capital investment therein by a small machine shop is unwarranted. Thus, many small machine shops are unable economically to perform such machining operations.

However, most machine shops as standard equipment have indexing or dividing heads adapted to receive a chuck or an arbor on which a work-piece is mounted.

Accordingly, objectives of the invention are to provide a means of converting typical simple indexing or dividing devices into an all-angle table which may be used to perform the same operations that heretofore required the use of an all-angle sine table without the investment required for an all-angle sine table; to provide an improved simple attachment construction for an indexing device which may be readily mounted on the indexing device to accomplish such conversion; and to provide a construction, arrangement and attachment means solving problems heretofore encountered in the art, achieving the stated objects in a simple, effective and inexpensive manner, and satisfying existing needs.

These and other objects and advantages apparent from the following description may be obtained, the stated results achieved, and the described difficulties overcome, by the structures, devices, elements, parts, attachments, combinations and cooperative arrangements which comprise the present invention, the nature of which is set forth in the following general statement, preferred embodiments of which—illustrative of the best modes in which applicant has contemplated applying the principles—are set forth in the following description and shown in the drawings, and which are particularly and distinctly pointed out and set forth in the appended claims forming part hereof.

The nature of the improved angle table construction may be stated in general terms as including in an indexing and dividing device of the type having a spindle rotatable to indexed positions about a first axis, preferably normally horizontal, means mounting the spindle for rotation to indexed positions about a second axis at right angles to said first axis, also preferably normally horizontal, and in which said device is provided with means for mounting the device on a work table of a machine tool; the combination of an angle-table converter attachment having a table member provided with a flat work surface, means on the table member for mounting a workpiece on said flat surface, and shank means projecting from the table member with the shank means axis extending parallel to the flat work surface of said table member.

By way of example, embodiments of the improved construction are shown in the accompanying drawings forming part hereof in which.

Similar numerals refer to similar parts throughout the various figures of the drawings.

Figure 1:
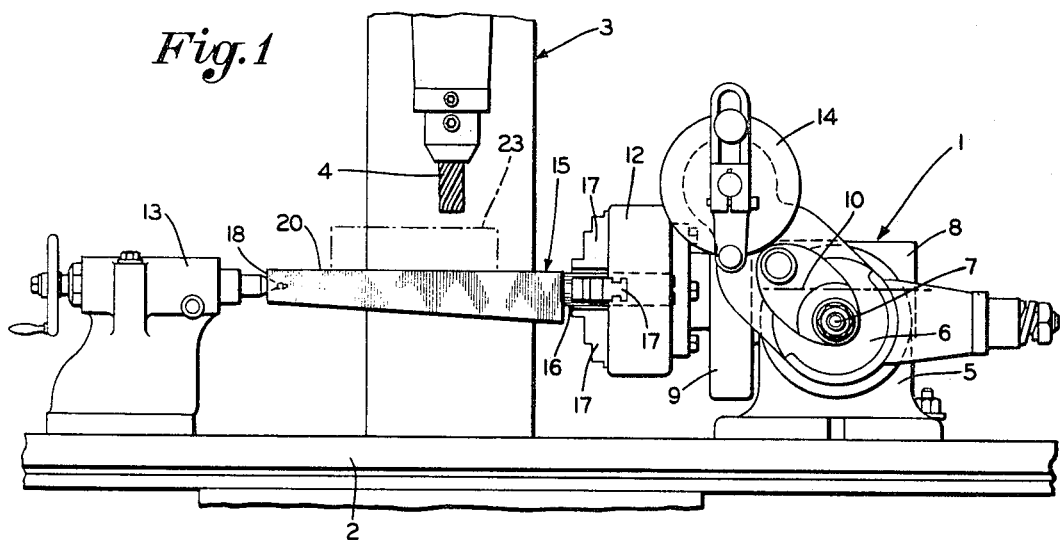
FIGURE 1 is a front elevation illustrating the improved all-angle table construction mounted on the work table of a milling machine.

A usual indexing or dividing device typically used in a machine shop is indicated generally at 1 mounted on the table 2 of a milling machine generally indicated at 3 including a milling cutter 4. The indexing device includes a head 5 in which a sleeve 6 is rotatably mounted rotatable about an axis 7 perpendicular to the plane of the drawing for tilting movement about said axis 7 to various adjusted positions of secondary housing 8 (FIG. 2) mounted on sleeve 6. A hollow spindle 9 is journaled within secondary housing 8 for rotatable adjustment about an axis 10 (FIG. 3) perpendicular to the plane in which the axis 7 lies and shown in dot-dash lines in FIG. 2.

Figure 2:
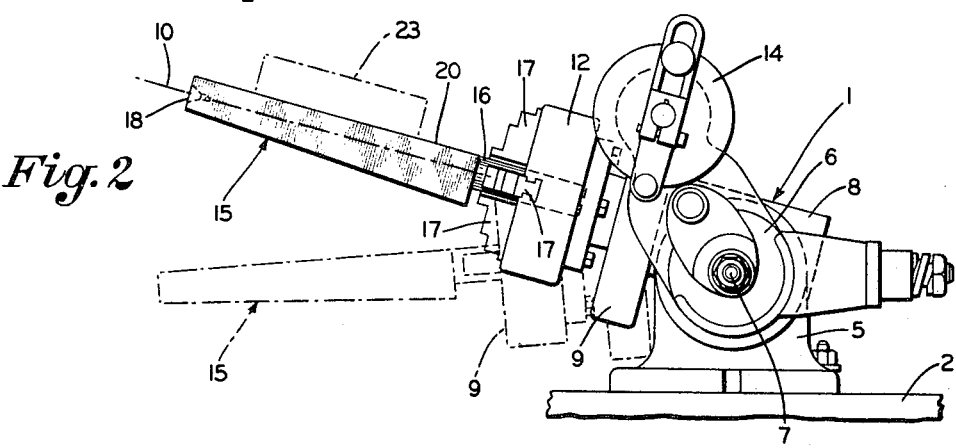
FIG. 2 is a view similar to a portion of FIG. 1 showing in full lines the improved attachment table tilted to one position out of horizontal on one axis of the dividing head and illustrating in dot-dash lines the table attachment tilted to another position out of horizontal.

Spindle 9 may have a usual tapered opening 11 therethrough (FIG. 4) receiving a tapered shank, not shown, of a usual chuck 12 (FIGS. 1 and 2). Indexing device 1 normally mounts a work-piece clamped by chuck 12 and held at its other end centered by tail stock means 13 also mounted on the table 2 of the milling machine 3 so that spline grooves, for example, may be cut in a part supported by chuck 12 and tail stock 13. After one cut, normally the indexing or dividing mechanism 14 is adjusted to rotate the chuck 12 the required amount for machining another similar groove such as a spline groove in the work-piece.

In accordance with the invention, an angle table converter attachment generally indicated at 15 is mounted on chuck 12 by gripping straight shank 16 of attachment 15 with the chuck jaws 17. Attachment 15 also may be supported at its other end 18 by tail stock 13.

Attachment 15 includes a table member 19 provided with a flat work surface 20. Typical T-slots 21 may be formed in table 19 for mounting a work-piece on the flat surface 20 in accordance with usual practice. The axis of shank 16, indicated by dot-dash lines in FIG. 5 at 22 extends parallel to the flat work surface 20 of table member 19.

Converter attachment 15 when moved out of horizontal location cannot be supported at its free end 18 by tail stock 13 (FIG. 2). A work-piece indicated at 23 in FIGS. 1 and 2 may be mounted in the usual manner on table surface 20 of attachment 15 and a machining operation performed thereon by milling cutter 4 while attachment 15 is held in horizontal position, both lengthwise and crosswise of the flat work surface 20, as shown in FIG. 1.

When it is desired to make one or more cuts angular with respect to the cut made when the parts are in the position of FIG. 1, the secondary housing 8 of indexing device 1 may be tilted by rotation of the housing 8 around axis 7 to any desired position such as indicated in full lines and also in dot-dash lines in FIG. 2.

Figure 3:
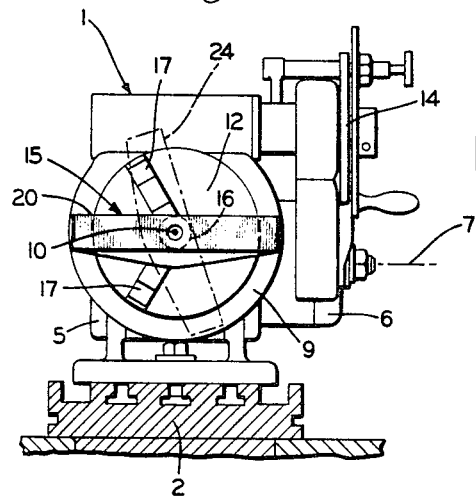
FIG. 3 is a view looking from left to right toward the end of the attachment table of FIG. 1 showing the angle table in horizontal position in full lines and rotated to an angular position in dot-dash lines.

Similarly, with the attachment 15 in the position of FIG. 1 or in any adjusted angular position represented in FIG. 2 (in each instance the plane of the flat top work surface 20 of table 15 is perpendicular to the plane of the paper), spindle 9 may be rotated by indexing or dividing mechanism 1 to any desired angular position throughout 360° of rotation, as indicated by the dot-dash line position 24 of attachment 15 in FIG. 3.

Converter attachment 15 when thus mounted cooperatively on the indexing device 1 converts the indexing device into an all-angle table so that a work-piece 23 supported thereon may have surfaces machined at any desired angles. Heretofore, a very expensive all-angle sine table was required in order to provide for such machining operations.

Figure 4:
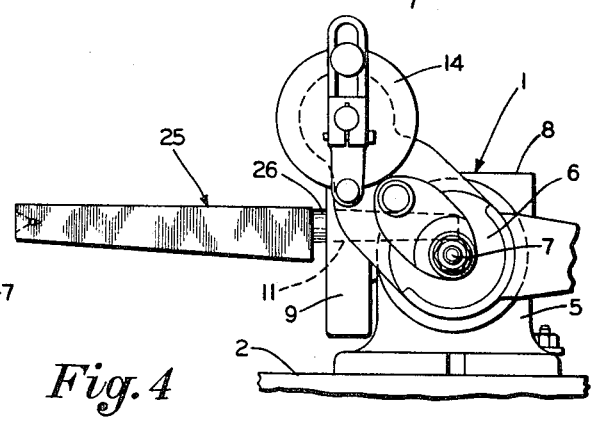
FIG. 4 is a view similar to a portion of FIG. 1 illustrating a modified form of table attachment with a tapered shank.
Figure 5:
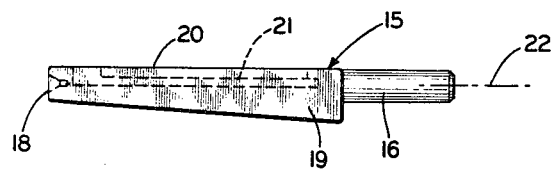
FIG. 5 is a side elevation of the table attachment shown in FIGS. 1, 2, and 3.
Figure 7:
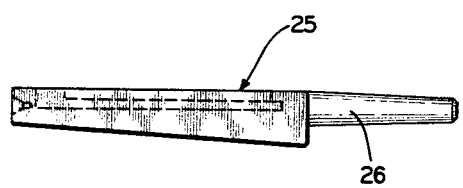
FIG. 7 is a side view of table attachment shown in FIG. 4.

An alternate form of converter attachment is illustrated at 25 in FIGS. 4 and 7 having a table member construction identical with that of the attachment 15 of FIG. 5. However, attachment 25 has a tapered shank 26 for mounting directly in the tapered sleeve opening 11 of secondary housing 8 of indexing device 1.

Figure 8:
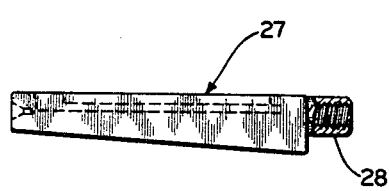
FIG. 8 is a side view of a modified form of table attachment with a threaded spindle mount.

Another alternate form of construction is illustrated in FIG. 8 wherein the converter attachment 27 has a threaded shank 28 for threaded connection with a threaded member carried by or extending through hollow spindle 9 of indexing device 1.

Figure 9:
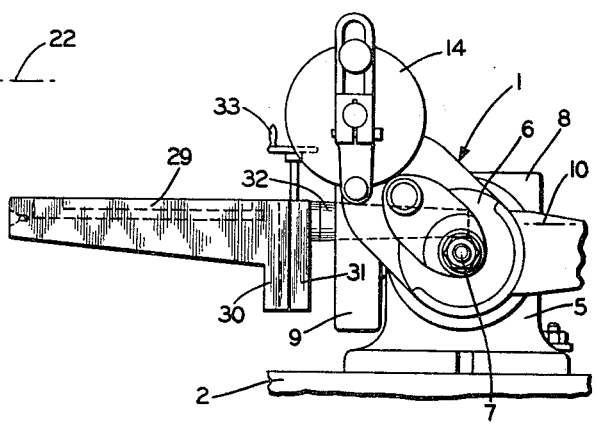
FIG. 9 is a view similar to FIG. 4 of an adjustable table attachment with a tapered shank mounted in an indexing head.
Figure 6:
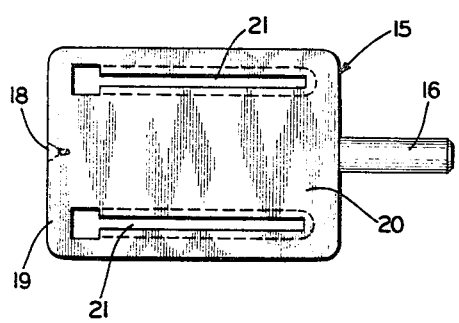
FIG. 6 is a top plan view thereof.
Figure 10:
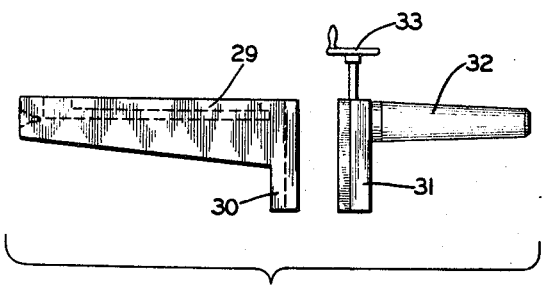
FIG. 10 is a separated side view of the parts of the adjustable table shown in FIG. 9.
Figure 11:
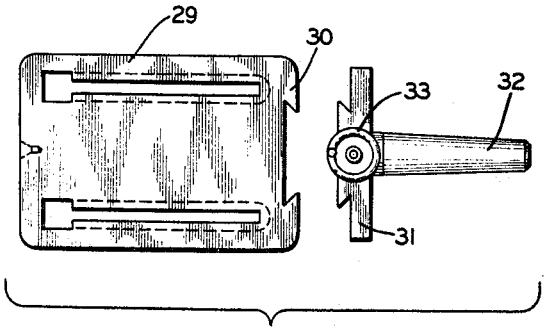
FIG. 11 is a top plan view of the members shown in FIG. 10.

Sometimes it is desirable in performing a machining operation to be able to locate the work-piece at or below the axis 10 of spindle 9. This may be accomplished by providing a converter attachment adjustable as to height as shown in FIGS. 9, 10 and 11 wherein table member 29 similar to table member 19 has a vertical groove slide member 30 formed at one end slidably mounted on a typical dove-tailed slide member 31 mounted on the attachment shank shown as a tapered shank at 32. Relative adjustment of slide members 30 and 31 may be accomplished in the usual manner by hand wheel adjusting screw 33.

Accordingly, the improved converter attachment and converted indexing device provide a new all-angle table construction for machining operations without requiring investment in an expensive all-angle sine table, provide constructions which may be used readily to accomplish the conversion; provide constructions which may have any one of the usual means of mounting a tool in machine tool operation such as a straight shank mount, a tapered shank mount, a threaded mount, or adjustability of the table with respect to the shank; and provide very simplified arrangements by which the indicated objectives and results may be obtained in a simple and inexpensive manner.

In the foregoing description, certain terms have been used for brevity, clearness, and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact details, sizes, etc. described or shown because various sized attachments may be made for use with various types, sizes and kinds of machine tools, without departing from the fundamental principles set forth.

Having now described the features, discoveries and principles of the invention, the manner in which the new constructions may be arranged, coordinated and used, the essential features thereof, and the advantageous, new and useful results obtained; the new and useful structures, devices, elements, parts, attachments, combinations, cooperative arrangements, and mechanical equivalents obvious to those skilled in the art are set forth in the appended claims.

I claim:

1. In a machine tool indexing and dividing device of the type having a spindle rotatable to indexed positions about a first normally horizontal axis and means mounting the spindle for rotation to indexed positions about a second normally horizontal axis at right angles to said first axis, and in which said indexing and dividing device is provided with means for mounting the device on a machine tool work table; the combination of an angle-table converter-attachment having a table member provided with an unobstructed flat work surface, means on the table member for mounting a workpiece on said flat work surface, shank means projecting longitudinally from one end of the table member, the shank means having an axis extending parallel to the plane of said flat work surface, and the shank means being operatively connected with the spindle of said indexing and dividing device, whereby the flat work surface of the table member may be rotated from below horizontal to and beyond vertical indexed positions.

2. The construction defined in claim 1 in which the operative connection between the attachment and spindle includes a tapered opening formed in said spindle, and a tapered shank on said attachment telescopically received in said tapered spindle opening.

3. The construction defined in claim 2 in which adjusting means is provided for relatively adjusting the axis of the tapered shank with respect to the flat table member work surface.

4. The construction defined in claim 1 in which the operative connection between the attachment and spindle includes a chuck mounted on the spindle and a straight shank on the attachment held by the chuck.

5. The construction defined in claim 1 in which the operative connection between the attachment and spindle includes a threaded shank on the attachment operatively connected to the spindle.

References Cited

UNITED STATES PATENTS

| | | | |
|---|---|---|---|
| 362,082 | 5/1887 | Holz et al. | 90—21.2 |
| 587,537 | 8/1897 | Van Norman | 90—58 |
| 1,110,389 | 9/1914 | Jeffery et al. | 90—57 |
| 1,139,475 | 5/1915 | Becker | 90—21.2 |
| 1,295,583 | 2/1919 | Parker | 90—21.2 |
| 2,118,063 | 5/1938 | Alward et al. | 90—56 |
| 2,607,105 | 8/1952 | Barkus | 90—56 |
| 3,313,210 | 4/1967 | Statter | 90—12 |

GERALD A. DOST, *Primary Examiner.*